United States Patent [19]
Brown

[11] Patent Number: 5,370,812
[45] Date of Patent: Dec. 6, 1994

[54] LUBRICANT COMPOSITIONS FOR REFRIGERATORS COMPRISING POLYALKYLENE GLYCOL AND A HYDROCARBON SOLVENT

[75] Inventor: William L. Brown, Pleasantville, N.Y.

[73] Assignee: Union Carbide Chemicals & Plastics Technology Corporation, Danbury, Conn.

[21] Appl. No.: 83,820

[22] Filed: Jun. 28, 1993

[51] Int. Cl.$^5$ .............................................. C09K 5/00
[52] U.S. Cl. ................................... 252/68; 252/52 A; 252/56 R
[58] Field of Search ...................... 252/56 R, 52 A, 68

[56] References Cited

U.S. PATENT DOCUMENTS

| | | | |
|---|---|---|---|
| 2,813,129 | 11/1957 | Benoit, Jr. et al. | 260/615 |
| 3,871,837 | 3/1975 | Bedague et al. | 44/58 |
| 4,248,726 | 2/1981 | Uchinnma et al. | 252/52 |
| 4,267,064 | 5/1981 | Sasaki et al. | 252/52 |
| 4,302,349 | 11/1981 | Kosswig et al. | 252/174.21 |
| 4,370,247 | 1/1983 | Ostyn | 252/46.7 |
| 4,493,776 | 1/1985 | Rhodes | 252/25 |
| 4,555,549 | 11/1985 | Camp et al. | 525/409 |
| 4,617,984 | 10/1986 | Harding et al. | 165/1 |
| 4,751,012 | 6/1988 | Ward et al. | 252/52 A |
| 4,755,316 | 7/1988 | Magid et al. | 252/68 |
| 4,793,939 | 12/1988 | Mori et al. | 252/52 A |
| 4,851,144 | 7/1989 | McGraw | 252/52 A |
| 4,900,463 | 2/1990 | Thomas et al. | 252/54 |
| 4,916,914 | 4/1990 | Short | 62/84 |
| 4,971,712 | 11/1990 | Gorski et al. | 252/52 A |
| 5,027,606 | 7/1991 | Short | 62/84 |
| 5,053,155 | 10/1991 | Mahler | 252/68 |
| 5,143,640 | 9/1992 | Moxey | 252/52 A |
| 5,152,926 | 10/1992 | Brown | 252/32.5 |
| 5,254,280 | 10/1993 | Thomas et al. | 252/68 |

OTHER PUBLICATIONS

CA Kerosene definition, RN 8008-20-6, 1994 ACS. (month not available).
Ucon Fluids & Lubricants, Ucon FG Lubricants 150, 220, and 400 for the Aluminum Industry Product Description Union Carbide Corporation/Specialty Chemicals Division 1987 (no month available).
Material Safety Data Sheet, Ucon FG Hydraulic Fluid 4623, Sep. 25, 1989.
Pag's Problem Solvers for Aluminum Rolling Mill Lubrication, Robert Eichelbaum, Recon Industries T. E. Kirk, Reynolds Metals Company, May 1, 1991.
Synthetic Lubricants Suitable for Use in Process and Hydrocarbon Compressors, John C. Tolfa.

Primary Examiner—Prince Willis, Jr.
Assistant Examiner—James M. Silbermann
Attorney, Agent, or Firm—G. L. Coon

[57] ABSTRACT

Lubricant compositions are disclosed which comprise polyalkylene glycols and hydrocarbon solvents having 15 or less carbon atoms per molecule. The polyalkylene glycols are soluble in fluorocarbon-based refrigerants, such as for example, HFC-134a, and the hydrocarbon solvents are soluble in the polyalkylene glycols. Thus, the lubricant compositions are particularly well suited as lubricants in refrigeration systems, such as for example, automobile air conditioners, which contain fluorocarbon-based refrigerants. Refrigerant/lubricant compositions comprising refrigerants and the lubricant compositions are also disclosed.

11 Claims, No Drawings

LUBRICANT COMPOSITIONS FOR REFRIGERATORS COMPRISING POLYALKYLENE GLYCOL AND A HYDROCARBON SOLVENT

FIELD OF THE INVENTION

The present invention generally relates to lubricant compositions and more specifically relates to lubricant compositions containing polyalkylene glycols and hydrocarbon solvents which are useful, for example, as lubricants in refrigeration systems.

BACKGROUND OF THE INVENTION

Due to environmental concerns, the use of chlorofluorocarbon-based refrigerants is being reduced. One chlorofluorocarbon-based refrigerant, CFC-12($CF_2CL_2$), has often been used in commercial, residential, and automotive air conditioning systems. Mineral oil lubricants have typically been used in refrigeration systems containing CFC-12 in order to inhibit mechanical wear of moving parts, e.g., the compressor.

Fluorocarbon-based refrigerants have been proposed as substitutes for the chlorofluorocarbon-based refrigerants since they are more compatible with the environment. Examples of fluorocarbon-based refrigerants include 1,1,1,2-tetrafluoroethane (HFC-134a), and 1,1,2,2-tetrafluoroethane (HFC-134). However, refrigerants such as HFC-134 and HFC-134a generally do not have sufficient solubility with mineral oils to make them suitable for use as lubricants in refrigeration systems containing such fluorocarbon-based refrigerants.

Certain polyalkylene glycols, which are soluble with fluorocarbon-based refrigerants, have been proposed for use as lubricants as an alternative to mineral oils. However, in some cases the lubricating properties of the polyalkylene glycols can be inferior to the lubricating properties of mineral oils. Thus, improved lubricant compositions containing polyalkylene glycols are desired.

In the technical field of machinery and engine lubrication, attempts have been made to solubilize mineral oils into polyalkylene glycols. However, this has required extensive modifications to the polyalkylene glycols, e.g., incorporation of long chain alcohol substituents and long chain oxyalkylene units which, unfortunately, can often reduce the solubility of the polyalkylene glycol in the fluorocarbon-based refrigerant. Thus, such modifications of the polyalkylene glycols would not be acceptable for use in refrigeration systems.

Accordingly, improved lubricant compositions comprising polyalkylene glycols which are compatible with fluorocarbon-based refrigerants are desired, for example, for use in refrigeration systems.

SUMMARY OF THE INVENTION

In accordance with the present invention, lubricant compositions comprising polyalkylene glycols and hydrocarbon solvents are provided which can have enhanced lubricity characteristics as compared to lubricating compositions comprising polyalkylene glycols alone or polyalkylene glycols with other additives. By virtue of the present invention, it is now possible to provide lubricant compositions having a high degree of lubricity which are also compatible with fluorocarbon-based refrigerants such as HFC-134a. In addition, solubility problems often associated with the use of mineral oils in combination with polyalkylene glycols have been solved by the present invention. Moreover, quite surprisingly, it has been found that the hydrocarbon solvents of the present invention, which are commonly avoided in lubricant compositions because of their viscosity-reducing effect, can actually enhance the lubricating properties of the polyalkylene glycols of the present invention.

DETAILED DESCRIPTION OF THE INVENTION

Polyalkylene glycols (PAGs) are well known commercial compounds which have many varied uses, including use as lubricants. Processes for their manufacture are also well known in the art; see, for example, *Encyclopedia of Polymer Science and Engineering*, Volume 6, pps. 225-274, "Ethylene Oxide Polymers and Copolymers", by Clinton and Matlock, 2nd Edition, 1986, John Wiley & Sons.

The PAGs used in the lubricant compositions of the present invention comprise oxyalkylene units selected from the group consisting of oxyethylene units and oxypropylene units. Typically, at least one of oxyethylene units and oxypropylene units will be present. Preferably, the sum of the concentrations of oxyethylene units and oxypropylene units is greater than about 50 wt. % and more preferably greater than about 90 wt. % of the PAG based on the weight of the PAG. Typically, less than about 80 wt. % of the PAG will comprise oxyethylene units based on the weight of the PAG. When oxyethylene units are present in the PAG, their concentration will generally range between about 1 to 75 wt. %, typically between about 25 to 75 wt. % and often between about 40 to 60 wt. %., based on the weight of the PAG. Typically, the concentration of oxypropylene units is greater than about 40 wt. %, preferably from about 40 to 100 wt. %, and more preferably, from about 50 to 100 wt. % based on the weight of the PAG.

In addition, the PAGs of the present invention comprise less than about 10 wt. %, preferably less than about 5 wt. % and more preferably less than about 1 wt. % of oxyalkylene units having 4 or more carbon atoms based on the weight of the PAG. Thus, the PAGs of the present invention are preferably prepared with propylene oxide and, if desired, ethylene oxide, as starting materials and are preferably substantially free of higher molecular weight alkylene oxide compounds such as, for example, butylene oxide, hexa-1-ene oxide and dodec-1-ene oxide.

Preferred PAGs useful in this invention have the composition encompassed by the general formula:

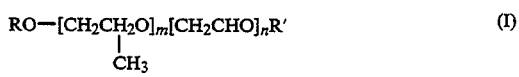

wherein R and R' can be hydrogen or an organic substituent having from 1 to 12 carbon atoms, preferably 1 to about 4 carbon atoms. Preferably, the organic substituents encompassed by R and R' are linear or branched alkyl groups. In addition, R', which end blocks or caps the PAG backbone, can comprise an ether or ester linkage.

In Formula I, m, and n have a value of zero or a positive number, provided the sum m+n is a positive number, typically not exceeding 1,000.

The PAGs of the present invention can be homopolymers, copolymers or terpolymers. The copolymers or terpolymers can be random, blocked, or branched. The oxyethylene and oxypropylene units can be present in any order or sequence. Mixtures of various PAGs can also be employed in the present invention.

The viscosity of the PAGs of the present invention typically ranges from about 100 to 2000 Saybolt Universal Seconds (SUS) at 100° F. Preferably, the viscosity ranges from about 100 to 750, more preferably from about 250 to 700 and most preferably from about 450 to 700 SUS at 100° F. As used herein, the term "viscosity" refers to each PAG used in the composition on an individual basis. Those skilled in the art can determine the viscosities of mixtures of PAG's suitable for use in accordance with the present invention.

The molecular weight of the PAGs of the present invention ranges from about 300 to 4,000, preferably from about 1000 to 2500 and most preferably from about 1200 to 1600 grams per gram mole. As used herein the term "molecular weight" means number average molecular weight.

As noted above, methods for preparing the PAGs of the present invention are known to those skilled in the art. In addition, the starting materials, e.g., ethylene oxide, propylene oxide, butanol, glycerol and hydrogen, are commercially available.

Quite advantageously, the PAGs of the present invention are soluble in HFC-134a. As used, herein, the term "soluble" means that at least 1 gram, preferably at least 5 grams and more preferably at least 10 grams of the solute, e.g., the PAG, is soluble in 100 grams of the solvent, e.g., HFC-134a, at atmospheric conditions, i.e., 70° F. and one atmosphere pressure.

Typically, the concentration of the PAG in the lubricant composition ranges from about 50 to 99.9 wt %, preferably from about 80 to 99 wt. % and most preferably from about 90 to 99 wt. % based on the weight of the lubricant composition.

The lubricant compositions of the present invention also contain a hydrocarbon additive. More specifically, the compositions of the present invention comprise one or more hydrocarbon solvents having 15 or less carbon atoms per molecule. As used herein, the term "hydrocarbon solvent" means one or more hydrocarbons which have solvency for mineral oil. Typically, the hydrocarbon solvent comprises at least one of normal or branched chain paraffins or olefins, cyclic hydrocarbons and aromatic hydrocarbons. Often, the hydrocarbon solvent is comprised of at least 50 wt. %, preferably at least 75 wt. % and most preferably at least 90 wt. % of normal or branched chain paraffins or olefins based on the weight of the hydrocarbon solvent. Preferably, the hydrocarbon solvent is selected from the group consisting of isoparaffins and normal paraffins. More preferably, the hydrocarbon solvent comprises from 10 to 15 carbon atoms per molecule and most preferably from 13 to 15 carbon atoms per molecule. In addition, the hydrocarbon solvent does not require the presence of functional groups such as, for example, esters, alcohols or adds. It is preferred that the hydrocarbon solvent contain less than about 5 wt. % and more preferably less than about 1 wt. % of oxygen-containing functional groups such as, for examples, esters, alcohols, acids, or mixtures thereof, based on the weight of the hydrocarbon solvent.

The viscosity of the hydrocarbon solvent generally ranges from about 10 to 200 SUS at 100° F., and is typically 150 SUS or less. Often the viscosity of the hydrocarbon solvent is from about 10 to 75 SUS at 100° F., preferably from about 20 to 50 SUS at 100° F. Hydrocarbon solvents having different viscosities can be combined to achieve the desired viscosity.

Typically, the concentration of the hydrocarbon solvent in the lubricant composition ranges from about 0.1 to 50 wt. %, preferably from about 1 to 20 wt. % and more preferably from about 1 to 10 wt. % based on the weight of the lubricant composition. It is preferred that the hydrocarbon solvents of the present invention are soluble in the PAGs of the present invention. Accordingly, it is preferred that the concentration of the hydrocarbon solvents in the lubricant compositions does not exceed the solubility of the hydrocarbon solvent in the PAGs.

The hydrocarbon solvents of the present invention are commercially available.

The lubricant compositions of the present invention may also contain additives such as for example, extreme pressure and anti-wear additives, oxidation and thermal stability improvers, corrosion inhibitors, viscosity index improvers, pour and floc point depressants, detergents, anti-foaming agents, and viscosity adjusters. The concentration of such additives generally ranges from about 0.1 to 5 wt. % based on the weight of the lubricant composition although higher and lower concentrations can be utilized. Further details concerning specific additives, their availability and their use in lubricant compositions are known to those skilled in the art.

The lubricant compositions of the present invention can be prepared for example, by combining the PAGs with the hydrocarbon solvents and additives if desired. The combination can be made by various means, including for example, mixing the hydrocarbon solvents with the PAGs under agitation conditions. Alternatively, the lubricating compositions can be made, in situ, in a refrigeration system by simply adding the PAGs and the hydrocarbon solvents to the refrigeration system. In some instances, refrigeration systems may already contain a sufficient quantity of PAG. Thus, in such cases, it may only be necessary to add the hydrocarbon solvents to the refrigeration system in order to prepare the lubricant compositions of the present invention. The above described methods for combining the PAGs with the hydrocarbon solvents of the present invention, e.g., mixing, stepwise addition and blending, are known to those skilled in the art.

Refrigerants useful in accordance with the present invention include fluorocarbon-based refrigerants, such as for example, methyl fluoride, methylene fluoride, difluoroethane, difluoroethylene, trifluoroethane, trifluoromethane, tetrafluoroethane, pentafluoroethane and mixtures thereof. HFC-134a and HFC-134 are preferred refrigerants for use in the accordance with the present invention. Such refrigerants are commercially available. The refrigerant/lubricant compositions of the present invention typically comprise from about 50 to 99 wt. % and preferably from about 70 to 95 wt. % refrigerant based on the weight of refrigerant/lubricant composition. Typically, the refrigerant/lubricant composition comprises less than about 50 wt. % and preferably from about 5 to 30 wt. % of a lubricant, i.e., the lubricant composition, based on the weight of the refrigerant/lubricant composition. A preferred refrigerant/lubricant composition comprises from about 70 to 95 wt. % refrigerant, from about 2 to 30 wt. % of the PAG, and from about 0.05 to 5 wt. % of the hydrocarbon solvent based on the weight of the refrigerant-/lubricant composition.

EXAMPLES

The following examples are presented for illustrative purposes and are not intended to limit the scope of the claims which follow. All parts and percentages are by weight unless otherwise specified.

The following ingredients were used in performing the Examples.

The PAGs used in the Examples are commercially available from Union Carbide Corporation, Danbury, Conn. under the tradename UCON. The identification of the PAGs used in the Examples is made in accordance with the following formula:

X—AS—Y where:

X is the wt. % of oxyethylene groups in the PAG. The balance comprises oxypropylene units. When no valve for X is present, there are no oxyethylene units in the PAG.

A is either H or L. H means that the PAG is hydrophilic. L means that the PAG is lipophilic.

S is the starter and is either B or G, B means that the PAG is started with butanol. G means that the PAG is started with glycerol.

Y is the viscosity of the PAG in SUS at 100° F.

(For example, 50-HB-660 is a hydrophilic, butanol started PAG containing 50 wt. % oxyethylene units and has a viscosity of 660 SUS at 100° F.)

CAPPED means that the terminal hydroxyl group of the polyalkylene glycol has been convened to an alkyl group. In these Examples, the PAG was acetoxy capped.

Isostearic Acid—a mixture of saturated fatty acid isomers having 18 carbon atoms, available frown Emery. Chemical Company, Cincinnati, Ohio.

1,2-Dodecanediol—a paraffinic diol having 12 carbon atoms with hydroxyl substituents on the first and second carbon atoms available from Aldrich Chemical Co., Milwaukee, Wis.

Capric Acid—a paraffinic acid having 10 carbon atoms available from Aldrich Chemical Co., Milwaukee, Wis.

Jayfiex® DIDP-E—1,2-benzene dicarboxylic acid di ($C_9$-$C_{11}$ alkyl ester) available from Coastal Chemical Abbenville, La.;

Emery 2918—an experimental diester synthetic lubricant base stock available from Emery Chemical Company, Cincinnati, Ohio.

L-77—a silicone surfactant available from Union Carbide Corporation, South Charleston, W. Va.

Cobratec® 700—an aromatic triazole available from PMC Specialties Group Inc., Cincinnati, Ohio.

LP-700—an alkoxylated phosphate ester available from GAF Corp., Wayne, N.J.

L-7001—a silicone surfaciant available from Union Carbide Corporation, South Charleston, W. Va.

Tolyltriazole (abbreviated TTZ)—an aromatic hetero nitrogen compound ($C_7N_3H_7$) available from PMC Specialties Group, Inc., Cincinnati, Ohio.

Benzotriazole—an aromatic hetero nitrogen compound ($C_6N_3H_5$) available from PMC Specialties Group, Inc., Cincinnati, Ohio.

Norpar® 13—a normal paraffin solvent having 13 carbon atoms available from Exxon Company, U.S.A., Houston, Tex.

Norpar® 15—a normal paraffin solvent having 15 carbon atoms available from Exxon Company, U.S.A., Houston, Tex.

DO-40—a chlorinated olefin containing 40 wt. % percent chlorine—available from Dover Chemical Corp., Dover, Ohio.

M-600—an amine-terminated propoxylate (CAS#70914419) available from Texaco Chemical Co., Bellaire, Tex.

Ortholeum 535—an amine neutralized phosphate ester available from DuPont, Wilmington, Del.

3GS Oil—a mineral oil having a viscosity of 150 SUS at 100° F., available from Wires Chemical Corp., Oakland, N.J. SUS at 100° F. available from Witco Chemical Corp., Oakland, N.J.

5GS Oil—a mineral oil having a viscosity of 500 SUS at 100° F., available from Witco Chemical Corp.. Oakland, N.J.

Lube A—a mixture of 50 wt. % M-600 33 wt % LP-700 and 17 wt. % TTZ.

BVM—100n—a paraffinic oil having a viscosity of 500 SUS at 100° F. available from BVA Associates. Detroit, Mich.

Example 1—Solubility

This Example demonstrates the solubilities of hydrocarbon solvents of the present invention in the PAGs of the present invention.

The solubilities were determined as follows.

The hydrocarbon compound and the PAG were added to a two ounce glass jar in various proportions such that the total weight of the hydrocarbon compound and the PAG was forty grams. The jar was then covered and shaken vigorously by hand for about 30 seconds. Then the jar was placed in a stationery position. After a minimum of one hour, the jar was visually inspected. The mixtures were considered soluble when one phase was present, i.e., a clear solution. Hazy solutions and two phase mixtures were indicative of insolubility.

Table 1 sets forth the solubilities of the above materials in accordance with the procedure set forth above.

TABLE 1

SOLUBILITY OF HYDROCARBON COMPOUNDS IN LB-625 AND 50-HB-660

| PAG | Paraffinic Compounds | | | Naphthenic Compounds | |
|---|---|---|---|---|---|
| | Norpar 13 31 SUS | Norpar 15 33 SUS | BVM-100n 500 SUS | 3GS 50 SUS | 5GS 500 SUS |
| LB-625 | >45 | >45 | 2.5–5.0 | >45 | 7.5–15 |
| 50-HB-660 | 7–9 | 5–7.5 | <0.5 | 5–10 | 0.2–0.5 |

NOTE: Solubilities listed in weight percent. A solubility of 5–10% means that 5 percent of the hydrocarbon compound was soluble in the PAG but 10 percent was not.

The viscosities of the hydrocarbon compounds are in SUS at 100° F.

Example 2 Oscillation Test

The following procedure was designed to simulate the low degree oscillatory motion conditions found in an automotive air conditioner compressor.

A solid steel ring was placed in contact with a stationary aluminum block of a known weight inside a chamber. One hundred cubic centimeters of the lubricant to be tested was added to the chamber which was sufficient to submerge the ring and most of the block. The area of contact between the ring and block was submerged in lubricant. The chamber was saturated with HFC-134a by bubbling HFC-134a through the lubricant for the duration of the test. Various lubricant additives were also tested during the trial.

During the test runs, the steel ring was oscillated 5 degrees at 600 rpm against the aluminum block under incrementally increasing loads. Initially the load between the block and steel ring was set at 100 pounds for a ten minute period. The load was then increased in 100 pound increments after eight minutes of operation. The pressure was increased until a 1000 pound force was exerted on the contact surface of the block and ring for eight minutes. The test run was then ended and the block was removed from the chamber.

Three measurements were taken on each of the blocks. Each of the blocks was weighed before and after the test to determine the amount of material worn away from the block. The width of the wear scar on the block was also measured and recorded. Finally the appearance of the worn area of the block was subjectively graded.

The optimal score of 0 indicates that no lines or scratches were found on the block. A score of 10 indicates that a few lines were apparent upon inspection. As the lines become closer together and darker, the wear area of the block becomes darker in color until the lines formed a solid black mark which was given a score of 80. Blocks with an appearance of 80 are badly worn, showing severe wear or galling in the center region. Wear marks darker in color and larger in size were given correspondingly higher scores.

The weight loss, scar width and appearance were noted in each test run and are presented in Table II below.

TABLE II

| RUN NO. | INGREDIENTS AND AMOUNTS (WT %) | WEIGHT LOSS (GRAMS) | SCAR WIDTH (CENTIMETERS) | APPEARANCE |
| --- | --- | --- | --- | --- |
| 1 | 50-HB-660 | 0.0177 | 0.80 | 85 |
| 2 | 50-HB-660 | 0.0147 | 0.70 | 75 |
| 3 | 50-HB-660, 1% DODECANEDIOL | 0.0130 | 0.65 | 50 |
| 4 | 50-HB-660, (0.6%) Lube A | 0.132 | 0.70 | 75 |
| 5 | 50-HB-660, 1% CAPRIC ACID, 5% M-600 | 0.0135 | 0.80 | 85 |
| 6 | 50-HB-660, 1% CAPRIC ACID, 1% M-600 | 0.1748 | 0.95 | 80 |
| 7 | 50-HB-660, 1% CAPRIC ACID | 0.0063 | 0.60 | 65 |
| 8 | 50-HB-660, 1% L-77 | 0.0215 | 0.80 | 85 |
| 9 | 50-HB-660, .5% COBRATEC 700 | 0.0262 | 0.90 | 75 |
| 10 | 50-HB-660, 1% LP-700 | 0.0187 | 0.80 | 80 |
| 11 | 50-HB-660, 1% L-7001 | 0.0138 | 0.75 | 80 |
| 12 | 50-HB-660, 1% TOLYTRIZOLE | 0.0257 | 0.90 | 75 |
| 13 | 50-HB-660, 1% BENZOTRIAZOLE | 0.0165 | 0.80 | 75 |
| 14 | 50-HB-660, 5% DO-40 | 0.0137 | 0.85 | 95 |
| 15 | 50-HB-660, 5% NORPAR 15 | 0.0080 | 0.60 | 75 |
| 16 | 50-HB-660, 5% NORPAR 13 | 0.0105 | 0.90 | 70 |
| 17 | 66.1% 50-HB-660, 28.37%, LD-1715 0.6% Lube A 5% NORPAR 15 | 0.0120 | 0.65 | 75 |
| 18 | 39.7%, 50-HB-660, 39.7%, LB-1715 10% LB-165 10% NORPAR 15, 0.6% Lube A | 0.0065 | 0.55 | 25 |
| 19 | LB-625 | 0.0133 | 0.70 | 60 |
| 20 | LB-625, 50% EMERY 2918 | 0.0155 | 0.80 | 80 |
| 21 | LB-625, 10% NORPAR 15 | 0.0031 | 0.50 | 15 |
| 22 | LB-625, 5% NORPAR 15 | 0.0107 | 0.60 | 25 |
| 23 | LB-625, 1% NORPAR 15 | 0.0145 | 0.65 | 25 |
| 24 | 36%, LB-625, 54%, LB-1715 10% NORPAR 15 | 0.0043 | 0.45 | 5 |
| 25 | LB-625, 10% 3GS OIL | 0.0126 | 0.60 | 25 |
| 26 | 36% 50-HB-500, 60%, LB-1715 10% NORPAR 15 | 0.0047 | 0.50 | 15 |
| 27 | 35.8%, 50-HB-500, | 0.0051 | 0.52 | 20 |

TABLE II-continued

| RUN NO. | INGREDIENTS AND AMOUNTS (WT %) | WEIGHT LOSS (GRAMS) | SCAR WIDTH (CENTIMETERS) | APPEARANCE |
|---|---|---|---|---|
|  | 53.7%, LB-1715 9.9% NORPAR 15, 0.3% M600, 0.2%, ORTHOLEUM 535 0.1% TTZ |  |  |  |
| 28 | 47.2%, 50-HB-500, 50%, LB-1715 5% NORPAR 15, 0.3% M600, 0.2%, ORTHOLEUM 535 0.1% TTZ | 0.0017 | 0.40 | 20 |
| 29 | LB-285 CAPPED | 0.0152 | 0.75 | 65 |
| 30 | LB-285 CAPPED, 1% DODECANEDIOL | 0.0116 | 0.60 | 30 |
| 31 | LB-285 CAPPED, 1% CAPRIC ACID | 0.0123 | 0.60 | 30 |
| 32 | LB-285 CAPPED, 4% CAPRIC ACID | 0.0121 | 0.80 | 30 |
| 33 | LB-285 CAPPED, 4% DECANEDIOL | 0.0091 | 0.60 | 35 |
| 34 | 43.3%, LB-285 35.4%, LB-165 20% DIDPE, 1% CAPRIC ACID, M600 | 0.3% | 0.65 | 25 |
| 35 | 3GS OIL |  |  | 0 |
| 36 | 5GS OIL | 0.0056 | 0.70 | 3 |

From the above Examples, it can be seen that quite surprisingly, the hydrocarbon solvents used in the Examples, e.g., Norpar 13 and Norpar 15, which are often used as solvents for higher molecular weight lubricious hydrocarbons, e.g. oils and greases, provided an significant enhancement in the lubricity of the PAG lubricant, as compared to the PAG lubricant alone or combined with other additives, particularly when the viscosity of the PAG was greater than 285 SU. In general, appearance scores of less than 50 were surprising and unexpected.

The Examples also demonstrate that the hydrocarbon solvents of the present invention have solubility in the PAGs of the present invention. In addition, the PAGs of the present invention are soluble in HFC-134a. Thus, the lubricant compositions of the present invention can be effectively utilized as lubricants, for example, in refrigeration systems such as, but not limited to, automobile, residential and commercial air conditioning systems, refrigeration systems, condensers, cold boxes, heat exchangers, and the like.

Those skilled in the art will recognize that although the present invention has been described with respect to specific aspects, other aspects of the invention are intended to be included within the scope of the claims which follow. For example, the lubricant compositions of the present invention may contain other ingredients not specifically identified herein. In addition, the lubricant compositions find utility in a number of diverse applications. They can be used to lubricate moving parts which are in continuous, oscillating or reciprocating motion. Illustrative uses include, but are not limited to, lubricating compressors, machinery parts such as gears and bearings, engines and wire and cable.

I claim:

1. A refrigerant/lubricant composition comprising
   (I) a refrigerant comprising at least one of tetrafluoroethane and pentafluoroethane; and
   (II) a lubricant comprising:
   a) from about 50 to 99.9 wt. % of the lubricant of a polyalkylene glycol comprising at least one of oxyethylene units and oxypropylene units, said polyalkylene glycol;
   (i) having less than 10 wt % of oxyalkylene units having four or more carbon atoms based on the weight of the polyalkylene glycol; and
   (ii) being soluble at 70° F. in refrigerant HFC-134a; and
   b) from about 0.1 to 50 wt % of the lubricant of a hydrocarbon solvent having 15 or less carbon atoms per molecule, said hydrocarbon solvent being soluble in said polyalkylene glycol.

2. The refrigerant/lubricant composition of claim 1 comprising from about 50 to 99 wt % of the refrigerant and from about 1 to 50 wt % of the lubricant based on the weight of the refrigerant/lubricant composition.

3. The composition of claim 2 wherein the polyalkylene glycol comprises less than 80 wt % of oxyethylene units based on the weight of the polyalkylene glycol.

4. The composition of claim 3 wherein the polyalkylene glycol comprises from about 1 to 75 wt % of oxyethylene units based on the weight of the polyalkylene glycol.

5. The composition of claim 2 wherein the polyalkylene glycol comprises from about 40 to 100 wt % of oxypropylene units based on the weight of the polyalkylene glycol.

6. The composition of claim 2 wherein the sum of the concentrations of oxyethylene units and oxypropylene units is at least 90 wt % based on the weight of the polyalkylene glycol.

7. The composition of claim 2 wherein the polyalkylene glycol comprises less than 1 wt % oxyalkylene units having four or more carbon atoms based on the weight of the polyalkylene glycol.

8. The composition of claim 2 wherein the hydrocarbon solvent comprises from 10 to 15 carbon atoms per molecule.

9. The composition of claim 8 wherein the hydrocarbon solvent comprises at least one of isoparaffins and normal paraffins.

10. The composition of claim 2 comprising from about 1 to 10 wt % of the hydrocarbon solvent based on the weight of the lubricant composition.

11. The composition of claim 2 wherein the viscosity of the polyalkylene glycol is from about 100 to 750 SUS at 100° F.

* * * * *